United States Patent
Zhou et al.

(10) Patent No.: US 9,584,997 B2
(45) Date of Patent: Feb. 28, 2017

(54) D2D DEVICE DISCOVERY METHOD AND APPARATUS BASED ON LTE CELLULAR COMMUNICATIONS SYSTEM

(71) Applicant: Huawei Technologies Co., Ltd., Shenzhen, Guangdong (CN)

(72) Inventors: Han Zhou, Beijing (CN); Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/550,307

(22) Filed: Nov. 21, 2014

(65) Prior Publication Data

US 2015/0078466 A1  Mar. 19, 2015

Related U.S. Application Data

(63) Continuation of application No. PCT/CN2012/082960, filed on Oct. 15, 2012.

(30) Foreign Application Priority Data

May 23, 2012  (CN) .......................... 2012 1 0162246

(51) Int. Cl.
*H04B 1/38* (2015.01)
*H04B 1/40* (2015.01)
(Continued)

(52) U.S. Cl.
CPC ............ *H04W 8/005* (2013.01); *H04B 17/16* (2015.01); *H04L 5/003* (2013.01);
(Continued)

(58) Field of Classification Search
CPC . H04W 56/004; H04W 72/042; H04W 88/08; H04W 4/005; H04W 56/00; H04W 56/003; H04W 24/08; H04W 72/04; H04W 16/26; H04W 36/18

USPC ............................................ 375/219; 455/73
See application file for complete search history.

(56) References Cited

U.S. PATENT DOCUMENTS

2002/0086644 A1* 7/2002 Koskinen ................ H01P 1/213
455/88
2003/0119547 A1* 6/2003 Leyh ...................... H04B 1/406
455/552.1
(Continued)

FOREIGN PATENT DOCUMENTS

CN       101771615 A       7/2010
EP       2 015 485 A1      1/2009
(Continued)

OTHER PUBLICATIONS

"Study on LTE Device to Device Discovery and Communication-Service and System Aspects", 3GPP TSG SA Plenary Meeting #52, Jun. 6-8, 2011, 5 pages.
(Continued)

*Primary Examiner* — Daniel Washburn
*Assistant Examiner* — Sarah Hassan

(57) ABSTRACT

This invention is applicable to the field of communications technologies, and provides a device to device (D2D) discovery method and a first D2D user equipment (UE). The method includes: the first D2D UE acquires timing information of the first D2D UE from a Lont Term Evolution (LTE) cellular communications system; receives in a discovery subframe, a device discovery signal from a second D2D UE according to the timing information, wherein the device discovery signal comprises a pilot orthogonal frequency division multiplexing (OFDM) symbol and a device information OFDM symbol; acquires an arrival time of the device discovery signal by performing a time domain correlation of the pilot OFDM symbol of the device discovery signal and a local pilot sequence, acquires device information of the second D2D UE by parsing the device information OFDM symbol of the device discovery. This invention enables a D2D UE to effectively discover other D2D UEs, (Continued)

improves system efficiency, and saves power of the D2D UE.

14 Claims, 8 Drawing Sheets

(51) Int. Cl.
| | |
|---|---|
| *H04W 8/00* | (2009.01) |
| *H04B 17/16* | (2015.01) |
| *H04L 5/00* | (2006.01) |
| *H04L 27/26* | (2006.01) |
| *H04W 76/02* | (2009.01) |
| *H04W 56/00* | (2009.01) |
| *H04W 40/24* | (2009.01) |

(52) U.S. Cl.
CPC ....... *H04L 27/2601* (2013.01); *H04W 40/246* (2013.01); *H04W 56/004* (2013.01); *H04W 76/023* (2013.01); *Y02B 60/50* (2013.01)

(56) References Cited

U.S. PATENT DOCUMENTS

| | | | | |
|---|---|---|---|---|
| 2004/0046016 A1* | 3/2004 | Becker | ................ | G06K 7/0008 235/380 |
| 2005/0057426 A1* | 3/2005 | Itkin | .................... | H04B 1/3877 343/876 |
| 2006/0018329 A1* | 1/2006 | Nielsen | ................... | H04L 47/52 370/401 |
| 2007/0123174 A1* | 5/2007 | Wiessner | ............... | H04B 17/16 455/73 |
| 2008/0082498 A1* | 4/2008 | Dong | .................... | H04L 1/0001 |
| 2010/0165882 A1* | 7/2010 | Palanki | ............... | H04W 76/023 370/254 |
| 2010/0316372 A1* | 12/2010 | Chang | ................ | H04B 10/0771 398/12 |
| 2011/0188552 A1* | 8/2011 | Yoon | ........................ | H04B 1/38 375/219 |
| 2011/0258313 A1* | 10/2011 | Mallik | .................. | H04W 8/005 709/224 |
| 2011/0268101 A1 | 11/2011 | Wang et al. | | |
| 2011/0317569 A1 | 12/2011 | Kneckt et al. | | |

FOREIGN PATENT DOCUMENTS

| | | |
|---|---|---|
| WO | WO 2011/080533 A1 | 7/2011 |
| WO | WO 2011/161560 A1 | 12/2011 |

OTHER PUBLICATIONS

"Operation Managed and Operator Assisted D2D", Intel, 3GPP TSG-SA WG1 Meeting #57, Feb. 13-17, 2012, 4 pages.

* cited by examiner

D2D DEVICE DISCOVERY METHOD AND APPARATUS BASED ON LTE CELLULAR COMMUNICATIONS SYSTEM

CROSS-REFERENCE TO RELATED APPLICATIONS

This application is a continuation of International Application No. PCT/CN2012/082960, filed on Oct. 15, 2012, which claims priority to Chinese Patent Application No. 201210162246.X, filed on May 23, 2012, both of which are hereby incorporated by reference in their entireties.

TECHNICAL FIELD

The present invention relates to the field of communications technologies, and in particular, to a D2D device discovery method and apparatus based on a Long Term Evolution (Long Term Evolution, LTE) cellular communications system.

BACKGROUND

In the last two decades, radio communications technologies have developed enormously and the radio communications technologies are emerging continuously. Radio communications networks increasingly occupy people's lives by virtue of its enormous flexibility, and become an indispensable part of people's lives.

However, radio spectrum resources are limited. With a sharp increase of persons who use the radio communications networks and with increasingly higher requirements on performance of the radio communications networks, a shortage of spectrum resources has become a key limitation on radio communication performance. Currently, a cellular network is a prevailing radio communications network. In this communication network, communication between two terminals needs to be forwarded by a base station, and a same packet, which is transmitted from a terminal to a base station and then from the base station to the terminal, occupies an air interface resource twice. If the two communications terminals are in a relatively long distance and incapable of reaching each other, this solution is relatively feasible. However, if two sides of communication are relatively close to each other within a communication scope of the other side, transmitting a packet between the terminals directly without the need to be forwarded by a base station can save half of resources.

Direct communication between a device and a device (D2D communication for short, Device to Device) enables direct communication between terminal devices without requiring any intermediate infrastructure. Therefore, the direct communication between terminal devices can use spectrum resources more efficiently, increase a capacity of a cellular network, and reduce overheads of control signaling of a base station, and is a technology that can bring enormous benefits to cellular network communications. Because the D2D communication is direct communication between terminals, a paging message needs to be directly sent from a paging terminal to a paged terminal without requiring assistance of the base station or a core network. Some conventional technologies can implement D2D communication, such as wifi, BT, and ad hoc. However, these systems all work in asynchronous mode. Therefore, in a D2D communications system in the prior art, system devices all work in asynchronous mode, and as a result a UE cannot effectively discover other UEs in a process of mutual discovery of D2D user equipments (User Equipment, UE), wasting system power.

SUMMARY

A purpose of embodiments of the present invention is to provide a D2D device discovery method based on an LTE cellular communications system, so as to improve system efficiency of a D2D communications system to some extent.

To achieve the foregoing purpose, the embodiments of the present invention provide the following technical solutions:

An embodiment of the present invention is implemented as follows: a D2D device discovery method based on a Long Term Evolution LTE cellular communications system, where the method includes:

acquiring, by a first D2D UE, timing information of the first D2D UE from the LTE cellular communications system;

receiving, by the first D2D UE in a discovery subframe, a device discovery signal from a second D2D UE according to the timing information, and the device discovery signal includes a pilot orthogonal frequency division multiplexing (Orthogonal Frequency Division Multiplexing, OFDM) symbol and a device information OFDM symbol; and acquiring, by the first D2D UE, an arrival time of the device discovery signal sent by the second D2D UE by performing a time domain correlation of the pilot OFDM symbol of the device discovery signal received in the discovery subframe and a local pilot sequence, and acquiring device information of the second D2D UE by parsing the device information OFDM symbol of the device discovery signal received in the discovery subframe, so as to discover the second D2D UE by the first D2D UE.

An embodiment of the present invention further provides a D2D device discovery apparatus based on a Long Term Evolution LTE cellular communications system, where the system includes:

an acquiring unit, configured for a first D2D UE to acquire timing information of the first D2D UE from the LTE cellular communications system;

a receiving unit, configured for the first D2D UE to receive, in a discovery subframe, a device discovery signal from a second D2D UE according to the timing information, and the device discovery signal includes a pilot orthogonal frequency division multiplexing OFDM symbol and a device information OFDM symbol; and a discovering unit, configured for the first D2D UE to: acquire an arrival time of the device discovery signal sent by the second D2D UE by performing a time domain correlation of the pilot OFDM symbol of the device discovery signal received in the discovery subframe and a local pilot sequence, and acquire device information of the second D2D UE by parsing the device information OFDM symbol of the device discovery signal received in the discovery subframe, so as to discover the second D2D UE by the first D2D UE.

Compared with the prior art, the embodiments of the present invention have the following beneficial effects: from an LTE cellular communications system, a first D2D UE acquires timing information of the first D2D UE, and receives, in a discovery subframe, a device discovery signal according to the timing information, where the device discovery signal is sent by a second D2D UE in the discovery subframe, and acquires an arrival time of the device discovery signal sent by the second D2D UE and device information of the second device according to the received discovery signal, thereby implementing D2D communication in an LTE cellular network system. In a synchronous communications system, the D2D UE may, in each discovery subframe, send a device discovery signal or monitor a device discovery signal sent by other devices. When one of two D2D UEs sends and the other D2D UE receives a device discovery signal in a same discovery subframe, device discovery can be implemented, thereby shortening a time of discovery between the D2D UEs, and enabling one D2D UE to effectively discover other D2D UEs. This improves system efficiency, and saves power of the D2D UE. In addition, due to compatibility with the LTE cellular network system, it is beneficial to implementation of D2D communication in a cellular network.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make objectives, technical solutions and advantages of the present invention clearer, the following describes the present invention in further detail with reference to accompanying drawings and embodiments. It should be understood that the specific embodiments described herein are merely for explaining the present invention, and are not intended to limit the present invention.

An embodiment of the present invention provides a D2D device discovery method based on a Long Term Evolution LTE cellular communications system, where the method includes:

acquiring, by a first D2D UE, timing information of the first D2D UE from the LTE cellular communications system;

receiving, by the first D2D UE in a discovery subframe, a device discovery signal from a second D2D UE according to the timing information, and the device discovery signal includes a pilot orthogonal frequency division multiplexing OFDM symbol and a device information OFDM symbol; and acquiring, by the first D2D UE, an arrival time of the device discovery signal sent by the second D2D UE by performing a time domain correlation of the pilot OFDM symbol of the device discovery signal received in the discovery subframe and a local pilot sequence, and acquiring device information of the second D2D UE by parsing the device information OFDM symbol of the device discovery signal received in the discovery subframe, so as to discover the second D2D UE by the first D2D UE.

An embodiment of the present invention further provides a D2D device discovery apparatus based on a Long Term Evolution LTE cellular communications system, where the system includes:

an acquiring unit, configured for a first D2D UE to acquire timing information of the first D2D UE from the LTE cellular communications system;

a receiving unit, configured for the first D2D UE to receive, in a discovery subframe, a device discovery signal from a second D2D UE according to the timing information, and the device discovery signal includes a pilot orthogonal frequency division multiplexing OFDM symbol and a device information OFDM symbol; and a discovering unit, configured for the first D2D UE to: acquire an arrival time of the device discovery signal sent by the second D2D UE by performing a time domain correlation of the pilot OFDM symbol of the device discovery signal received in the discovery subframe and a local pilot sequence, and acquire device info Ration of the second D2D UE by parsing the device information OFDM symbol of the device discovery signal received in the discovery subframe, so as to discover the second D2D UE by the first D2D UE. The following describes the implementation of the present invention in detail with reference to specific embodiments:

Embodiment 1

Figure 1:
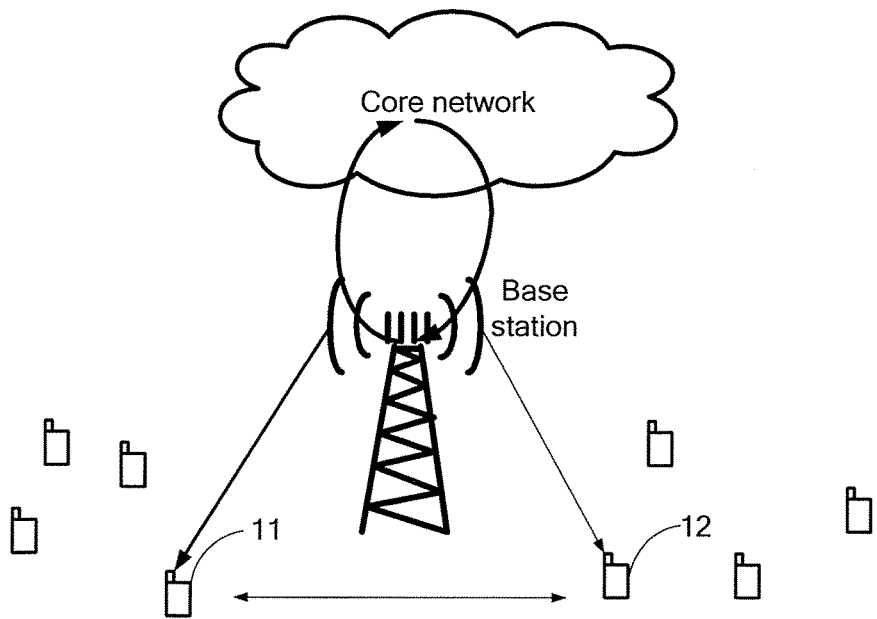
FIG. 1 is a schematic diagram of network deployment of a D2D device discovery system based on an LTE cellular communications system according to Embodiment 1 of the present invention.

FIG. 1 shows a schematic diagram of network deployment of a D2D device discovery system based on an LTE cellular communications system according to Embodiment 1 of the present invention. The system includes a plurality of D2D UEs, and a process in which device discovery is implemented between the D2D UE devices and based on an LTE cellular communications system is as follows: Each D2D UE acquires its own timing from the LTE cellular system; sends, in a discovery subframe, a device discovery signal; and receives, in the discovery subframe, device discovery signals of other D2D UEs, where the device discovery signal includes a pilot OFDM symbol and a device information OFDM symbol, so that device discovery is implemented between the D2D UEs; and basic information and timing of an adjacent D2D UE are acquired, so that mutual discovery is implemented between the D2D UE devices. Using a first D2D UE 11 and a second D2D UE 12 as an example, a process in which device discovery is implemented between the first D2D UE 11 and the second D2D UE 12 and based on an LTE cellular communications system is as follows: the first D2D UE sends, in a discovery subframe, a device discovery signal according to uplink timing (or downlink timing) of the first D2D UE, the second D2D UE device receives, in the discovery subframe, the device discovery signal according to uplink timing (or downlink timing) of the second D2D UE, where the device discovery signal is sent by the first D2D UE, and the second D2D UE performs a time domain correlation according to a pilot OFDM symbol and a device information OFDM symbol of the first D2D UE to acquire an arrival time of the device discovery signal sent by the first D2D UE, where the device discovery signal is sent by the first D2D UE, to acquire device information of the first D2D UE by parsing. In this way, the second D2D UE discovers the first D2D UE. Similarly, the first D2D UE can discover the second D2D UE. The following gives description by using an embodiment.

Figure 2:
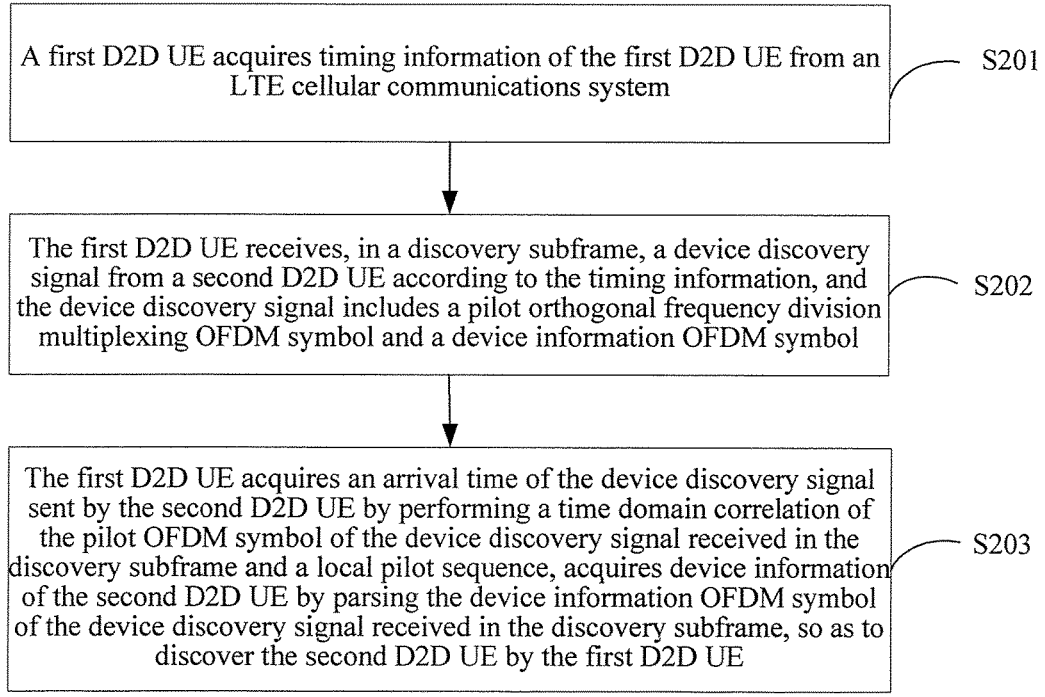
FIG. 2 is a schematic flowchart of implementing a D2D device discovery method based on an LTE cellular communications system according to Embodiment 1 of the present invention.

FIG. 2 shows a flowchart of implementing a D2D device discovery method based on an LTE cellular communications system according to Embodiment 1 of the present invention, as detailed below:

In S201, A first D2D UE acquires timing information of the first D2D UE from the LTE cellular communications system.

In this embodiment, the D2D UE may acquire timing information of the first D2D UE from synchronization information of a cell, where the timing information is a time at which a signal is sent or received.

In S202, the first D2D UE receives, in a discovery subframe, a device discovery signal from a second D2D UE according to the timing information, and the device discovery signal includes a pilot OFDM symbol and a device information OFDM symbol.

In this embodiment, the first D2D UE receives, in the discovery subframe, the device discovery signal according to the timing information and according to a timing structure, where the device discovery signal is sent by the second D2D UE in the discovery subframe, and the timing structure includes the discovery subframe.

In this embodiment, the device discovery signal includes a device information OFDM symbol and a pilot OFDM symbol, and the device information OFDM symbol is used to carry basic information of a device, such as a device ID and a device type; and the pilot OFDM symbol is used for synchronization and channel estimation.

In S203, the first D2D UE acquires an arrival time of the device discovery signal sent by the second D2D UE by performing a time domain correlation of the pilot OFDM symbol of the device discovery signal received in the discovery subframe and a local pilot sequence, parses the device information OFDM symbol of the device discovery signal received in the discovery subframe, to acquire device information of the second D2D UE, thereby discovering the second D2D UE.

In this embodiment, the first D2D UE and the second D2D UE may be in a sleep state for a long time, and need to wake up only when a device discovery signal is sent or received, thereby effectively saving power of the D2D UE.

In this embodiment, a time at which a signal is sent to the second D2D UE is calculated according to the acquired arrival time of the device discovery signal sent by the second D2D UE and the device information of the second device, thereby providing a condition for further paging and communication between the D2D UEs.

In this embodiment, from an LTE cellular communications system, a first D2D UE acquires timing information of the first D2D UE, and receives, in a discovery subframe, a device discovery signal according to the timing information, where the device discovery signal is sent by a second D2D UE, and acquires an arrival time of the device discovery signal sent by the second D2D UE and device information of the second device according to the device discovery signal received in the discovery subframe, thereby implementing D2D communication in an LTE cellular network system. In a synchronous communications system, the D2D UE may, in each discovery subframe, send a device discovery signal or monitor a device discovery signal sent by other devices. When one of two D2D UEs sends and the other D2D UE receives a device discovery signal in a same discovery subframe, device discovery can be implemented, thereby shortening a time of discovery between the D2D UEs, and enabling one D2D UE to effectively discover other D2D UEs. This improves system efficiency, and saves power of the D2D UE. In addition, due to compatibility with the LTE cellular network system, it is beneficial to implementation of D2D communication in a cellular network.

Embodiment 2

Figure 3:
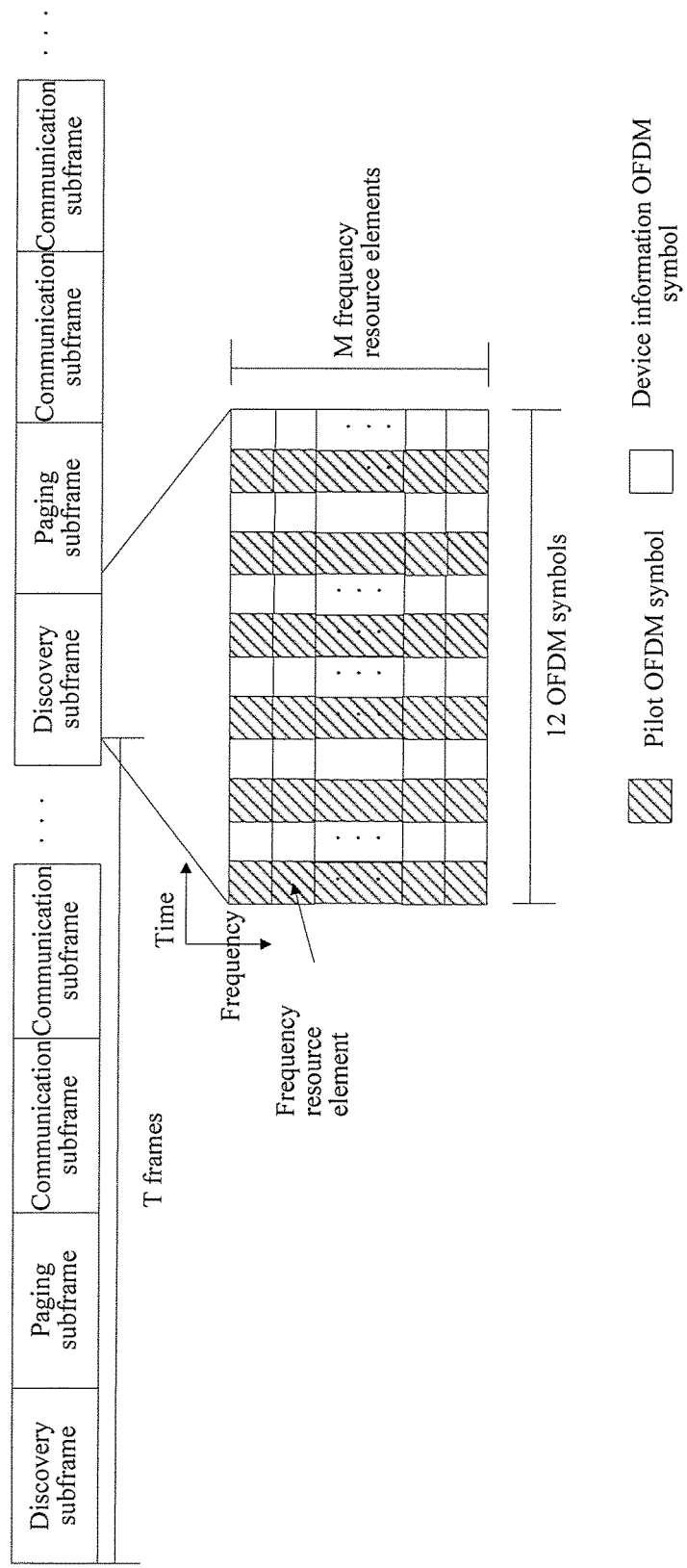
FIG. 3 is a schematic diagram of a timing structure of a D2D communications network according to Embodiment 2 of the present invention.

In this embodiment, in a D2D device discovery process, a timing structure of a D2D communications network may be similar to a timing structure of an LTE cellular network. As shown in FIG. 3, similar to the LTE timing structure, each subframe is 1 ms in length and consist of two timeslots of 0.5 millisecond, and each timeslot consist of six (extended cyclic prefix (cyclic prefix, CP)) or seven (normal CP) OFDM symbols. Every 10 subframes form a 10 ms radio frame. According to functions, each subframe may be a discovery subframe, a paging subframe or a communication subframe.

In this embodiment, the discovery subframe is primarily used for device recovery. It carries information such as a pilot, a device identifier, a device type, and a service provided by a device. Each D2D UE discovers other adjacent D2D UEs and their device information by using the discovery subframe, thereby providing a condition for further D2D communication.

It is unnecessary that each radio frame includes the discovery subframe. As shown in FIG. 3, at intervals of T radio frames, one radio frame includes the discovery subframe, where T=1, . . . , t, a value of t depends on power saving of the UE and load of cellular UEs and D2D UEs in a cell. When there are a relatively large number of D2D UEs, a value of t may be increased; when there are a relatively small number of D2D UEs, a value of t may be decreased. In addition, the value of t may be notified, by an evolved Node B (evolved Node B, eNB) to perform dynamic or semi-static configuration, to all D2D UEs by means of broadcasting.

In this embodiment, to avoid interference between cellular communication and D2D communication, a cellular resource scheduling center (base station) may further schedule cellular communication at a position different from a discovery subframe location.

In this embodiment, the discovery subframe includes a plurality of OFDM symbols. For example, the discovery subframe may include 12 OFDM symbols or 14 OFDM symbols, which are pilot OFDM symbols and device information OFDM symbols. Each of the OFDM symbols is divided into M frequency resource elements in a frequency domain, where M is an integer greater than or equal to 1. Each frequency resource element includes several subcarriers. Further, one or more frequency resource elements of each OFDM symbol serve as a device discovery resource element, and one or more of the device discovery resource elements are selected by each D2D UE as a carrier for a device discovery signal of the each D2D UE. Specifically, each D2D UE sends the device discovery signal on several device discovery resource elements of the discovery subframe, and each D2D UE receives device discovery signals of other D2D UEs on all the device discovery resource elements of the discovery subframe.

In addition, the paging subframe is primarily used for direct paging between the D2D UEs, and is primarily used to carry a device identifier of a paging destination UE, and further, may carry a paging source communications device identifier, so that the paging destination UE confirms a paging source and sends paging response information, and may further carry information such as communication frequency resources and power of a communication subframe to help create a communication link between two sides of communication, that is, the paging source and the paging destination UE, and provide a guarantee for next-step data transmission. The paging subframe immediately follows the discovery subframe, which is considered based on two factors: First, such a practice can improve communication efficiency, and the UE can page a UE immediately after discovering the UE it wants to communicate with in the discovery subframe, so as to create a communication link and begin communication instead of waiting for the paging subframe for a further long time before paging, thereby reducing a delay and improving communication quality; and, second, such a practice is beneficial to a consideration of power saving of the UE and avoids frequently waking up the UE.

Communication subframes are subframes that have the largest quantity, and are primarily used for data transmission, thereby improving a D2D data transmission rate significantly.

Embodiment 3

A D2D device discovery method based on an LTE cellular communications system according to an embodiment of the present invention may further include: sending, by the first D2D UE, a device discovery signal to the second D2D UE in the discovery subframe according to the timing information, so that the second D2D UE receives, in the discovery subframe, the device discovery signal sent by the first D2D UE, performs a time domain correlation of a pilot OFDM symbol of the device discovery signal received in the discovery subframe and a local pilot sequence, to acquire an arrival time of the device discovery signal sent by the first D2D UE, parses a device information OFDM symbol of the device discovery signal received in the discovery subframe, to acquire device information of the first D2D UE, so that the second D2D UE discovers the first D2D UE. This step may be performed before the first D2D UE performs device discovery of the second D2D UE, or after the first D2D UE performs device discovery of the second D2D UE.

In this embodiment, a first D2D UE sends a device discovery signal to a second D2D UE in a discovery subframe according to timing information, so that the second D2D UE discovers a device of the first D2D UE according to the device discovery signal sent by the first D2D UE. This process shortens a time of discovery between the D2D UEs, enables one D2D UE to effectively discover other D2D UEs, improves system efficiency, and saves power of the D2D UE.

Embodiment 4

In this embodiment, timing information is uplink timing or downlink timing, and therefore:

the receiving, in Embodiment 1 by the first D2D UE in a discovery subframe, a device discovery signal from a second D2D UE according to the timing information, is: receiving, by the first D2D UE in the discovery subframe, the device discovery signal from a second D2D UE according to the uplink timing or the downlink timing of the first D2D UE, where the device discovery signal is sent by the second D2D UE;

the sending, in Embodiment 3 by the first D2D UE, a device discovery signal to the second D2D UE in the discovery subframe according to the timing information is: sending, by the first D2D UE, the device discovery signal to the second D2D UE in the discovery subframe according to the uplink timing or the downlink timing of the first D2D UE.

Figure 4:
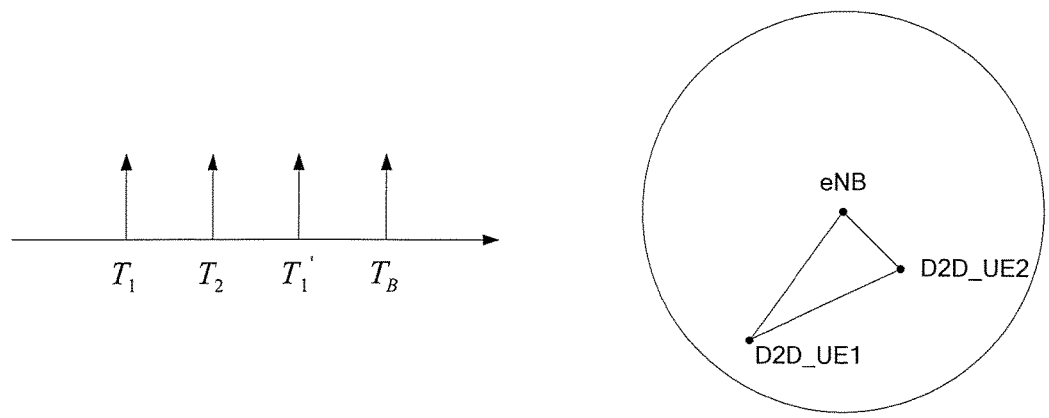
FIG. 4 is a schematic diagram of receiving and sending a D2D device discovery signal by means of uplink timing according to Embodiment 4 of the present invention.

The following describes principles of implementing the receiving, by the first D2D UE in the discovery subframe, the device discovery signal by means of uplink timing or downlink timing of the first D2D UE, where the device discovery signal is sent by the second D2D UE and the sending, by the first D2D UE, the device discovery signal to the second D2D UE in the discovery subframe by means of uplink timing or downlink timing of the first D2D UE:

for a scenario in which the first D2D UE receives, in the discovery subframe, the device discovery signal by means of uplink timing of the first D2D UE, where the device discovery signal is sent by the second D2D UE, and the first D2D UE sends, in the discovery subframe, the device discovery signal to the second D2D UE by means of uplink timing of the first D2D UE, refer to FIG. 4, which is a schematic diagram of sending and receiving a D2D device discovery signal by means of uplink timing, where the left diagram shows a timing relationship between D2D UEs, and the right diagram shows a location relationship between D2D UEs. It is assumed that D2D_UE 1 is a D2D UE that sends a device discovery signal, and D2D_UE 2 is a D2D UE that receives device discovery signals of other D2D UEs. The D2D_UE 1 sends the device discovery signal by means of uplink timing of the first D2D UE $T_1$; and, at the same time, the D2D_UE 2 receives the device discovery signal of the D2D_UE 1 by means of uplink timing of the second D2D UE $T_2$. The device discovery signal of the D2D_UE 1 arrives at the D2D_UE 2 at time $T'_1$, as shown in the left diagram of FIG. 4, where $T_B$ is eNB timing. Because $\Delta T = T_2 - T_1 = (T_B - T_1) - (T_B - T_2)$, $T_B - T_1$ may serve as a distance between the D2D_UE 1 and an eNB, and $T_B - T_2$ may serve as a distance between the D2D_UE 2 and the eNB. Similarly, $T'_1 - T_1$ may serve as a distance between the D2D_UE 1 and the D2D_UE 2. Then according to location relationships between the D2D_UE 1, the D2D_UE 2, and the eNB, it can be learned that $(T_B - T_1) - (T_B - T_1) \leq T'_1 - T_1$, and that a time at which the device discovery signal of the D2D_UE 1 arrives at the D2D_UE 2 is definitely after the time $T_2$ at which the device discovery signals of other D2D UE devices are received by the D2D_UE 2. In this way, the device discovery signals of other D2D UE devices can be received completely, and interference between discovery subframe signals of different D2D UEs and interference on uplink signals of other cellular UEs can be avoided effectively.

Figure 5:
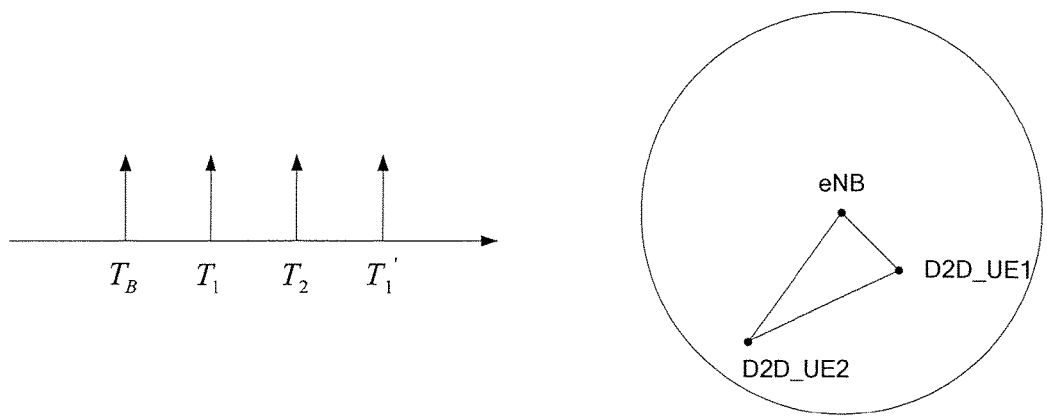
FIG. 5 is a schematic diagram of receiving and sending a D2D device discovery signal by means of downlink timing according to Embodiment 4 of the present invention.

For a scenario in which the first D2D UE receives, in the discovery subframe, the device discovery signal by means of downlink timing of the first D2D UE, where the device discovery signal is sent by the second D2D UE, and the first D2D UE sends, in the discovery subframe, the device discovery signal to the second D2D UE by means of downlink timing of the first D2D UE, refer to FIG. 5, which is a schematic diagram of sending and receiving a D2D discovery subframe signal by means of downlink timing, where the left diagram shows a timing relationship between D2D UEs, and the right diagram shows a location relationship between D2D UEs. It is assumed that D2D_UE 1 is a D2D UE that sends a device discovery signal, and D2D_UE 2 is a D2D UE that receives device discovery signals of other D2D UEs. The D2D_UE 1 sends the device discovery signal by means of downlink timing of the first D2D UE $T_1$; and, at the same time, the D2D_UE 2 receives the device discovery signal of the D2D_UE 1 by means of downlink timing of the second D2D_UE 2 $T_2$. The device discovery signal of the D2D_UE 1 arrives at the D2D_UE 2 at time $T'_1$, as shown in the left diagram of FIG. 5, where $T_B$ is eNB timing. Because $\Delta T = T_2 - T_1 = (T_2 - T_B) - (T_1 - T_B)$ $T_1 - T_B$ may serve as a distance between the D2D_UE 1 and an eNB, and $T_2 - T_B$ may serve as a distance between the D2D_UE 2 and the eNB. Similarly, $T'_1 - T_1$ may serve as a distance between the D2D_UE 1 and the D2D_UE 2. Then according to location relationships between the D2D_UE 1, the D2D_UE 2, and the eNB, it can be learned that $(T_2 - T_B) - (T_1 - T_B) \le T'_1 - T_1$, and that a time at which the device discovery signal of the D2D_UE 1 arrives at the D2D_UE 2 is definitely after the time $T_2$ at which the device discovery signals of other D2D UE devices are received by the D2D_UE 2. In this way, the device discovery signals of other D2D UE devices can be received completely, and interference between device discovery signals of different D2D UEs and interference on uplink signals of other cellular UEs can be avoided effectively.

In this embodiment, on several device discovery resource elements of a discovery subframe, a D2D UE sends a device discovery signal by means of its own uplink timing or downlink timing, or receives device discovery signals of other D2D UEs by means of its own uplink timing or downlink timing. Therefore, when sending or receiving the device discovery signal, each D2D UE can separate the device discovery signals of different UEs in a time domain and a frequency domain, thereby avoiding a discovery conflict between D2D UEs, improving a success ratio of device discovery, and improving discovery efficiency.

Embodiment 5

In this embodiment, the discovery subframe includes a plurality of OFDM symbols, and each OFDM symbol includes a cyclic prefix (Cyclic Prefix, CP), and a length of the CP may be determined in the following manner:

1. A guard interval (Gard Interval, GI) is added to the discovery subframe, where the GI is located between the discovery subframe and an adjacent paging subframe following the discovery subframe, and the length of the CP of the discovery subframe is determined according to the GI; or 2. Both the discovery subframe and an adjacent paging subframe following the discovery subframe use normal CPs; or 3. Both the discovery subframe and an adjacent paging subframe following the discovery subframe use extended CPs.

To meet requirements in a D2D device discovery scenario, it is necessary to determine the length of the CP of the discovery subframe signal, and determine a device discovery distance according to the length of the CP. Primarily the following two requirements are considered for the length of the CP and the device discovery distance:

First, a maximum difference of a time when discovery subframe signals from a plurality of D2D UEs that sends device discovery signals arrive at a same D2D UE that receives the device discovery signals cannot be greater than a length of a CP, so as to avoid inter-carrier interference caused by damage to carrier orthogonality between different D2D UEs.

Second, a maximum delay extension of the last OFDM symbol of the discovery subframe cannot interfere with the first OFDM symbol of a subsequent paging subframe signal, so as to avoid intersymbol interference.

Figure 6:
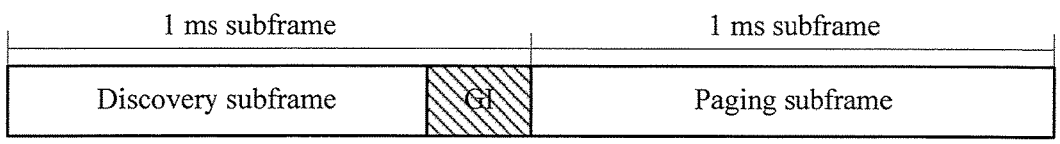
FIG. 6 is a schematic diagram of a timing structure of a discovery subframe according to Embodiment 5 of the present invention.

The following describes the foregoing three methods of determining a length of a CP:

1. A guard interval GI is added to the discovery subframe, where the GI is located between the discovery subframe and an adjacent paging subframe following the discovery subframe, and the length of the CP of the discovery subframe is determined according to the GI. FIG. 6 is a schematic diagram of a timing structure of a discovery subframe. A guard interval (GI) is added between the discovery subframe and a subsequent paging subframe. In this case, the length of the CP is 15.625 us, and, for a 20 M bandwidth, is 480 Ts; and the length of the GI is 12.5 us, and, for a 20 M bandwidth, is 384 Ts. The subsequent paging subframe is a normal CP. When this frame format is used, the maximum device discovery distance is 1.5625 km.

Figure 7:
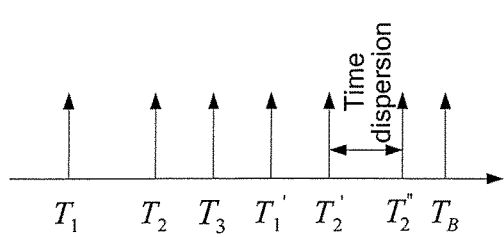
FIG. 7 is a schematic diagram of a maximum time difference of a device discovery signal according to Embodiment 5 of the present invention.
Figure 7:
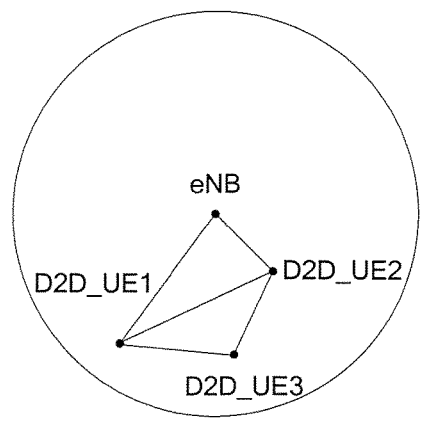

First, considering a requirement of a first aspect, the maximum difference of a time when device discovery signals from a plurality of D2D UEs that sends the device discovery signals arrive at a same D2D UE that receives the device discovery signals is calculated. FIG. 7 is a schematic diagram of the maximum time difference of device discovery signals, where the left diagram shows a timing relationship of the device discovery signals, and the right diagram shows a location relationship between D2D UEs. D2D_UE 1 sends a device discovery signal at its uplink timing $T_1$, D2D_UE 2 sends a device discovery signal at its uplink timing $T_2$, and a D2D_UE 3 receives the device discovery signals of the D2D_UE 1 and the D2D_UE 2 at its uplink timing $T_3$. The D2D_UE 3 receives the device discovery signal of the D2D_UE 1 at time $T'_1$, and receives the device discovery signal of the D2D_UE 2 at time $T'_2$. The device discovery signal delay of the D2D_UE 2 is extended to $T''_2$, that is, the delay is extended to $T_d = T''_2 - T'_2$. It is generally deemed that $T_d$ is equal to a propagation time of a signal. Therefore, a difference of a time at which the two device discovery signals arrive at the D2D_UE 3 is:

$$\Delta T = |T''_2 - T'_1| = |T'_2 + T_d - T'_1| = |T_2 + T_{23}) - (T_1 + T_{13}) + T_d| = |(T_2 - T_1) + (T_{23} - T_{13}) + T_d| \le |T_2 - T_1| + |T_{23} - T_{13}| + T_d \le 2T_{12} + T_d$$

As can be learned that, when and only when $(T_2 - T_1)$ $(T_{23} - T_{13}) > 0$ and $|T_2 - T_1| = T_{12}$, $|T_{23} - T_{13}| = T_{12}$, the equal sign is justified, where $T_{12}$ is a time at which the signal from the D2D_UE 1 arrives at the D2D_UE 2, $T_{23}$ is a time at which the signal from the D2D_UE 2 arrives at the D2D_UE 3, and $T_{13}$ is a time at which the signal from the D2D_UE 1 arrives at the D2D_UE 3. From the foregoing analysis, it can be learned that when the D2D_UE 1 coincides with the D2D_UE 3 and the D2D_UE 2 is between the D2D_UE 1 and the eNB and they form a straight line, the difference of a time at which the device discovery signals of the D2D_UE 1 and the D2D_UE 2 arrive at the D2D_UE 3 is the largest. In this case, $T_d=T_{12}$, and the maximum delay difference is $\Delta T_{max}=3T_{12}$. In addition, to avoid intersymbol interference and inter-carrier interference of the discovery subframe, the length $T_{CP,dis}$ of the CP of the discovery subframe needs to meet the following: $T_{CP,dis} \geq 3T_{12}$.

Figure 8:
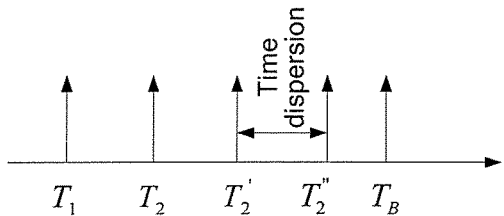
FIG. 8 is a schematic diagram of a maximum delay of a device discovery signal according to Embodiment 5 of the present invention.
Figure 8:
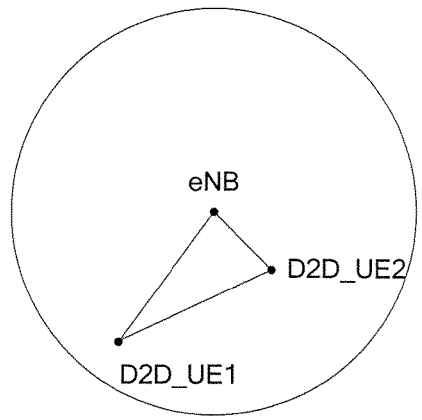

The following considers a requirement of a second aspect and calculates the maximum impact caused by extension of the delay of the discovery subframe on a subsequent paging subframe. FIG. 8 is a schematic diagram of a maximum delay of device discovery signals, where the left diagram shows a timing relationship of the device discovery signals, and the right diagram shows a location relationship between D2D UEs. D2D_UE 2 sends a device discovery signal at its uplink timing $T_2$, and D2D_UE 1 receives a device discovery signal of the D2D_UE 2 at its uplink timing $T_1$. Subsequently, the D2D_UE 1 receives the device discovery signal of the D2D_UE 2 at time $T'_2$, and the device discovery signal delay of the D2D_UE 2 is extended to $T''_2$, that is, the delay is extended to $T_d=T''_2-T'_2$. It is generally deemed that $T_d$ is equal to a propagation time of a signal. Therefore, a delay difference of a time at which the device discovery signals of the D2D_UE 2 arrive at the D2D_UE 1 is:

$$\Delta T = |T'_2 - T_1 + T_d| = |T_2 + T_{12} - T_1 + T_d| \leq |T_2 - T_1| + T_{12} + T_d \leq 2T_{12} + T_d$$

As can be learned that, when and only when $T_2-T_1=T_{12}$, the equal sign is justified, where $T_{12}$ is a transmission time of the signal from the D2D_UE 2 to the D2D_UE 1. In this case, $T_d=T_{12}$, and the maximum delay time is $\Delta T_{max}=3T_{12}$. In this case, a guard interval is added between the discovery subframe and a subsequent paging subframe to avoid intersymbol interference caused by the last OFDM symbol of the discovery subframe on the first OFDM symbol of the subsequent paging subframe. A length of the guard interval needs to meet the following: $T_{GI}+T_{CP,normal} \geq 3T_{12}$, where $T_{CP,normal}$ is a length of a normal CP. According to the foregoing analysis, a length of the CP, the length of the guard interval, and a maximum device discovery distance may be calculated by using the following equation set:

$$\begin{cases} T_{CP,dis} = 3T_{12} \\ T_{GI} + T_{CP,normal} = 3T_{12} \\ T_{cp,dis} * 12 + T_{OFDM} * 12 + T_{GI} = T_{subframe} \end{cases}$$

Therefore, it is calculated that the length of the CP of the discovery subframe is 15.78 us, and, for a 20 M bandwidth, is 485 Ts; and the length of the GI is 10.55 us, and, for a 20 M bandwidth, is 324 Ts. Because the number of sampling points of the CP is preferably an integer multiple of 16, the length of the CP may be set to 15.625 us, and, for a 20 M bandwidth, to 480 Ts; and the length of the GI is 12.5 us, and, for a 20 M bandwidth, is 384 Ts. The maximum device discovery distance is 1.5625 km.

2. Both the discovery subframe and an adjacent paging subframe following the discovery subframe are normal CPs (normal CP). The length of the normal CP is 4.96 us, and for a 20 M bandwidth, is 144 Ts. By using the normal CP, the two requirements of D2D device discovery can also be met. For details, deducing may be performed by referring to the manner in method 1, and no repeated description is given here. In this case, the longest device discovery distance is 469 m.

3. Both the discovery subframe and an adjacent paging subframe following the discovery subframe are extended CPs (extended CP). The length of the extended CP is 16.67 us, and for a 20 M bandwidth, is 512 Ts. By using the extended CP, the requirements of the two aspects of the D2D device discovery can also be met. For details, deducing may be performed by referring to the manner in method 1, and no repeated description is given here. In this case, the longest device discovery distance is 1.66 km.

It is noteworthy that the normal CP and the extended CP in method 2 and method 3 are two CP lengths that are generally used in an LTE communications system, and are common knowledge for a person skilled in the art.

In this embodiment, the discovery subframe uses a CP of an appropriate length, for example, by adding a guard interval between the discovery subframe and the paging subframe, so as to effectively avoid interference between the device discovery signals of D2D UEs.

Embodiment 6

In this embodiment, the discovery subframe includes a plurality of OFDM symbols, and a frame structure of the discovery subframe may use the following manner: in a plurality of OFDM symbols of the discovery subframe, at least two OFDM symbols are selected as one group, each group includes one pilot OFDM symbol and at least one device information OFDM symbol, and, when the number of OFDM symbols included in each group is greater than 2, the pilot OFDM symbol is located in a non-edge location in each group, where pilot sequences on different device discovery resource elements of the discovery subframe are orthogonal.

Specifically, when the discovery subframe includes 12 OFDM symbols, the frame structure of the discovery subframe is:

every two of the 12 OFDM symbols of the discovery subframe are divided into one group, and, in each group, the first symbol is a pilot OFDM symbol and the second symbol is a device information OFDM symbol; or every two of the 12 OFDM symbols of the discovery subframe are divided into one group, and, in each group, the first symbol is a device information OFDM symbol and the second symbol is a pilot OFDM symbol; or every three of the 12 OFDM symbols of the discovery subframe are divided into one group, and, in each group, the first symbol and the third symbol are device information OFDM symbols and the second symbol is a pilot OFDM symbol; or every four of the 12 OFDM symbols of the discovery subframe are divided into one group, and, in each group, the second symbol is a pilot OFDM symbol and the first symbol, the third symbol and the fourth symbol are device information OFDM symbols; or every four of the 12 OFDM symbols of the discovery subframe are divided into one group, and, in each group, the third symbol is a pilot OFDM symbol and the first symbol, the second symbol and the fourth symbol are device information OFDM symbols.

Figure 9:
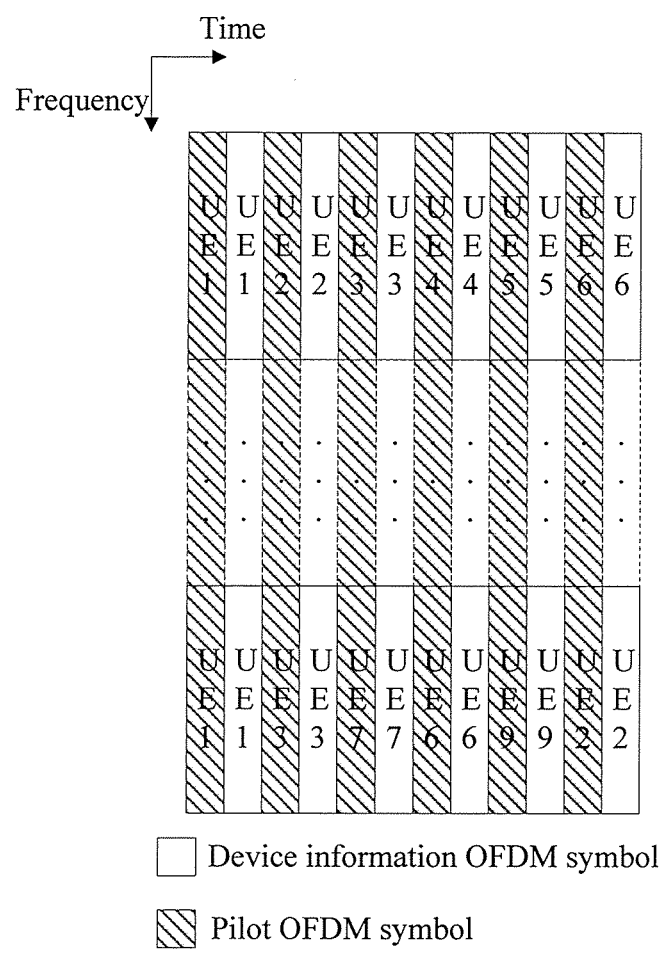
FIG. 9 is a structural diagram of time frequency of a discovery subframe according to Embodiment 6 of the present invention.

For ease of understanding, an implementation example is used as follows to describe time-frequency resource structure design of the discovery subframe:

FIG. 9 shows a structural diagram of time frequency of a discovery subframe signal. Each OFDM symbol of the discovery subframe is divided into a plurality of device discovery resource elements in a frequency domain. Every two of the 12 OFDM symbols of the discovery subframe are divided into one group, and, in each group, the first symbol is a pilot OFDM symbol and the second symbol is a device information OFDM symbol. A pilot OFDM symbol alternates with a device information OFDM symbol in distribution. The pilot OFDM symbol is primarily used for synchronization and channel estimation, and the device information OFDM symbol primarily carries basic information (such as a device ID) of a device. From one or more groups of pilot OFDM symbols and device information OFDM symbols, each D2D UE selects one or more device discovery resource elements to send pilot and device information.

Figure 10:
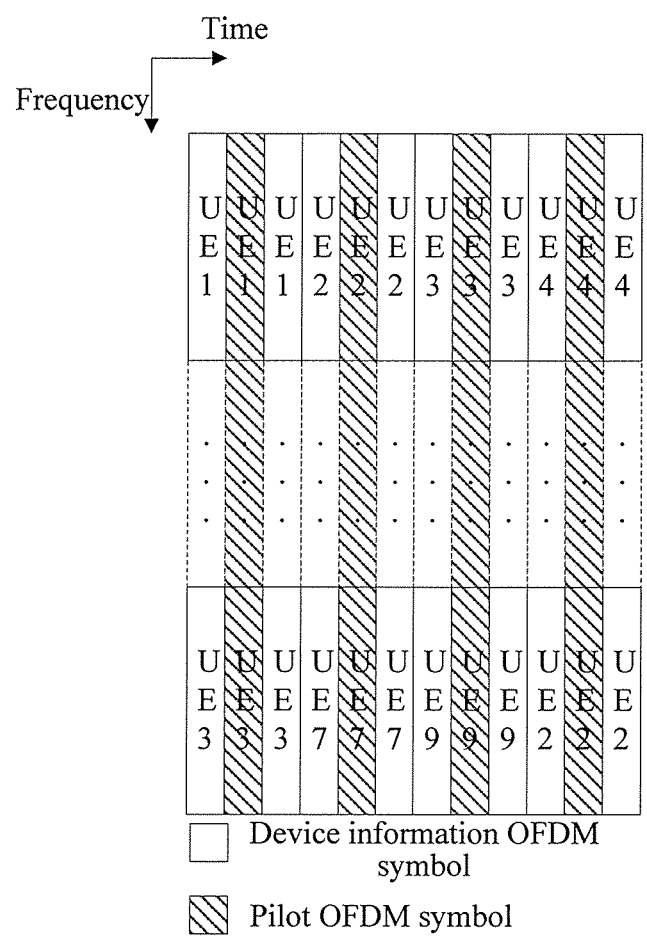
FIG. 10 is a structural diagram of time frequency of another discovery subframe according to Embodiment 6 of the present invention.

FIG. 10 shows a structural diagram of time frequency of another discovery subframe signal. Every three of the 12 OFDM symbols of the discovery subframe are divided into one group, and, in each group, the first symbol and the third symbol are device information OFDM symbols and the second symbol is a pilot OFDM symbol.

Figure 11:
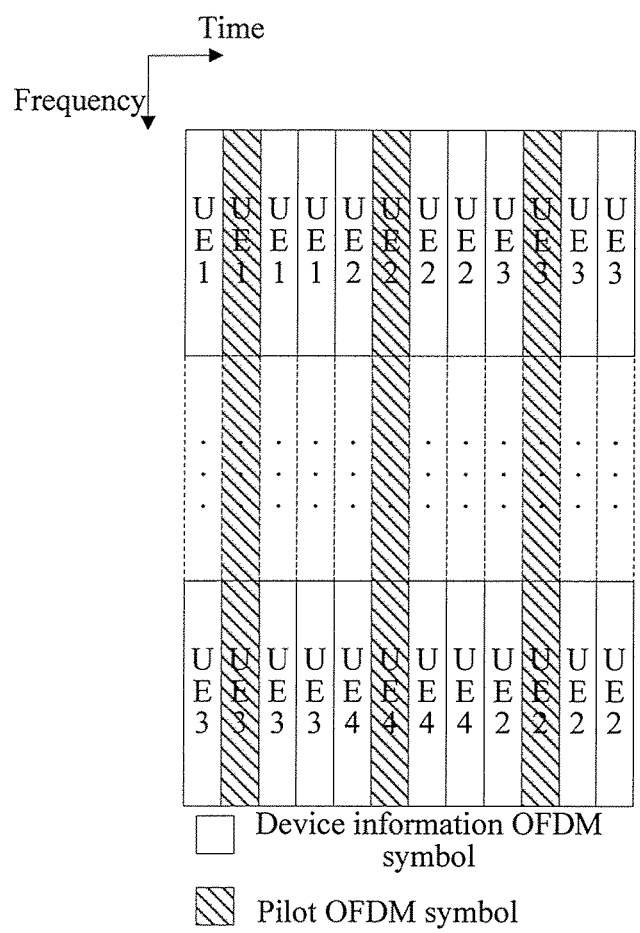
FIG. 11 is a structural diagram of time frequency of yet another discovery subframe according to Embodiment 6 of the present invention.

FIG. 11 shows a structural diagram of time frequency of yet another discovery subframe signal. Every four of the 12 OFDM symbols of the discovery subframe are divided into one group, and, in each group, the second symbol is a pilot OFDM symbol and the first symbol, the third symbol and the fourth symbol are device information OFDM symbols.

Similarly, when the discovery subframe includes 14 OFDM symbols, the frame structure of the discovery subframe is:

every two of the 14 OFDM symbols of the discovery subframe are divided into one group, and, in each group, the first symbol is a pilot OFDM symbol and the second symbol is a device information OFDM symbol; or every two of the 14 OFDM symbols of the discovery subframe are divided into one group, and, in each group, the first symbol is a device information OFDM symbol and the second symbol is a pilot OFDM symbol; or every seven of the 14 OFDM symbols of the discovery subframe are divided into one group, and, in each group, any one symbol among the second symbol to the sixth symbol is a pilot OFDM symbol and other six OFDM symbols are device information OFDM symbols.

Embodiment 7

Figure 12:
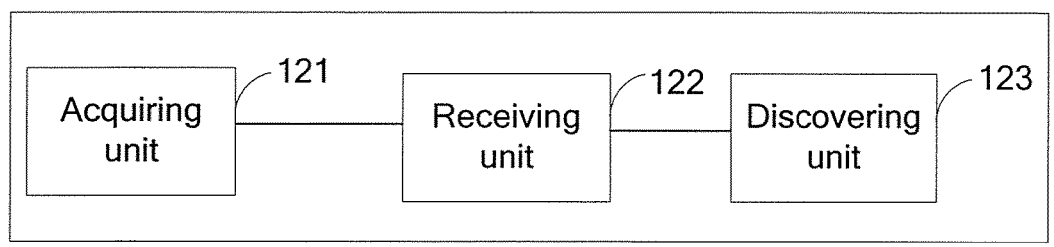
FIG. 12 is a schematic structural diagram of a D2D device discovery apparatus based on a Long Term Evolution LTE cellular communications system according to Embodiment 7 of the present invention.

FIG. 12 shows a schematic structural diagram of a D2D device discovery apparatus based on a Long Term Evolution LTE cellular communications system according to Embodiment 7 of the present invention. For ease of description, only parts related to this embodiment of the present invention are shown.

The D2D device discovery apparatus may include an acquiring unit 121, a receiving unit 122, and a discovering unit 123.

The acquiring unit 121 is configured for a first D2D UE to acquire timing information of the first D2D UE from the LTE cellular communications system.

The receiving unit 122 is configured for the first D2D UE to receive, in a discovery subframe, a device discovery signal from a second D2D UE according to the timing information, and the device discovery signal includes a pilot orthogonal frequency division multiplexing OFDM symbol and a device information OFDM symbol.

The discovering unit 123 is configured for the first D2D UE to acquire an arrival time of the device discovery signal sent by the second D2D UE by performing a time domain correlation of the pilot OFDM symbol of the device discovery signal received in the discovery subframe and a local pilot sequence, parse the device information OFDM symbol of the device discovery signal received in the discovery subframe, to acquire device information of the second D2D UE, so that the first D2D UE discovers the second D2D UE.

In this embodiment, each OFDM symbol of the discovery subframe signal is divided into M frequency resource elements in a frequency domain, one or more frequency resource elements of each OFDM symbol serve as a device discovery resource element, and one or more of the device discovery resource elements are selected by each D2D UE as a carrier for a device discovery signal of the each D2D UE.

The D2D device discovery apparatus based on a Long Term Evolution LTE cellular communications system according to this embodiment of the present invention may be applied in the corresponding method Embodiments 1 and 2. For details, refer to the description in Embodiments 1 and 2, and no repeated description is given here.

Embodiment 8

Figure 13:
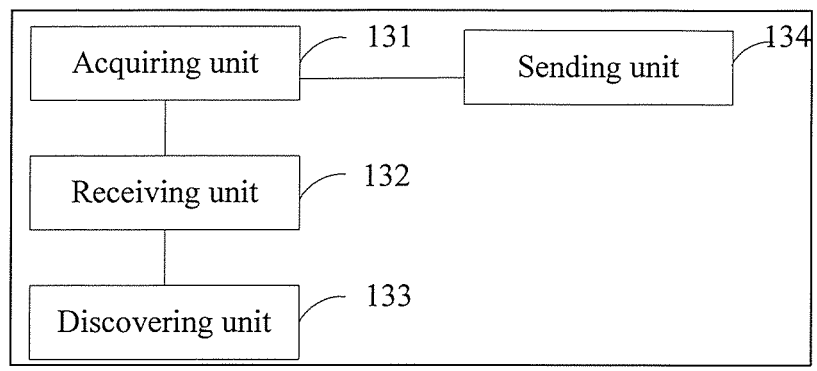
FIG. 13 is a schematic structural diagram of a D2D device discovery apparatus based on a Long Term Evolution LTE cellular communications system according to Embodiment 8 of the present invention.

On the D2D device discovery apparatus based on a Long Term Evolution LTE cellular communications system in Embodiment 7 further includes a sending unit. Refer to FIG. 13, which shows a structural diagram of a D2D device discovery apparatus based on a Long Term Evolution LTE cellular communications system according to Embodiment 8 of the present invention. The system includes an acquiring unit 131, a receiving unit 132, a discovering unit 133, and a sending unit 134.

Differences between the present invention and Embodiment 7 are as follows:

The sending unit 134 is configured for a first D2D UE to send a device discovery signal to a second D2D UE in a discovery subframe according to the timing information, so that the second D2D UE receives, in the discovery subframe, the device discovery signal sent by the first D2D UE, performs a time domain correlation of a pilot OFDM symbol of the device discovery signal received in the discovery subframe and a local pilot sequence, to acquire an arrival time of the device discovery signal sent by the first D2D UE, parses a device information OFDM symbol of the device discovery signal received in the discovery subframe, to acquire device information of the first D2D UE, so that the second D2D UE discovers the first D2D UE.

Optionally, when the timing information is uplink timing or downlink timing, the receiving unit 132 is configured for the first D2D UE to receive, in the discovery subframe, the device discovery signal according to the uplink timing or the downlink timing of the first D2D UE, where the device discovery signal is sent by the second D2D UE.

The sending unit 134 is configured for the first D2D UE to send the device discovery signal to the second D2D UE in the discovery subframe according to the uplink timing or the downlink timing of the first D2D UE.

The D2D device discovery apparatus based on a Long Tezai Evolution LTE cellular communications system according to the embodiment of the present invention may be applied in the corresponding method Embodiments 3 and 4. For details, refer to the description in Embodiments 3 and 4, and no repeated description is given here.

Embodiment 9

In this embodiment, the discovery subframe includes a plurality of OFDM symbols, and each OFDM symbol includes one CP, and a length of the CP is as follows:

a guard interval GI is added to the discovery subframe, where the GI is located between the discovery subframe and an adjacent paging subframe following the discovery subframe, and the length of the CP of the discovery subframe is determined according to the GI; or both the discovery subframe and an adjacent paging subframe following the discovery subframe use normal CPs; or both the discovery subframe and an adjacent paging subframe following the discovery subframe use extended CPs.

A structure of the CP provided in this embodiment of the present invention may be applied in the corresponding method embodiment 5. For details, refer to the description in Embodiment 5, and no repeated description is given here.

Embodiment 10

The discovery subframe includes a plurality of OFDM symbols, and a frame structure of the discovery subframe is:

In a plurality of OFDM symbols of the discovery subframe, at least two OFDM symbols are selected as one group, each group includes one pilot OFDM symbol and at least one device information OFDM symbol, and, when the number of OFDM symbols included in each group is greater than 2, the pilot OFDM symbol is located in a non-edge location in each group, where pilot sequences on different device discovery resource elements on each OFDM of the discovery subframe are orthogonal.

Optionally, when the discovery subframe includes 12 OFDM symbols, the frame structure of the discovery subframe is:

every two of the 12 OFDM symbols of the discovery subframe are divided into one group, and, in each group, the first symbol is a pilot OFDM symbol and the second symbol is a device information OFDM symbol; or every two of the 12 OFDM symbols of the discovery subframe are divided into one group, and, in each group, the first symbol is a device information OFDM symbol and the second symbol is a pilot OFDM symbol; or every three of the 12 OFDM symbols of the discovery subframe are divided into one group, and, in each group, the first symbol and the third symbol are device information OFDM symbols and the second symbol is a pilot OFDM symbol; or every four of the 12 OFDM symbols of the discovery subframe are divided into one group, and, in each group, the second symbol is a pilot OFDM symbol and the first symbol, the third symbol and the fourth symbol are device information OFDM symbols; or every four of the 12 OFDM symbols of the discovery subframe are divided into one group, and, in each group, the third symbol is a pilot OFDM symbol and the first symbol, the second symbol and the fourth symbol are device information OFDM symbols.

When the discovery subframe includes 14 OFDM symbols, the frame structure of the discovery subframe is:

every two of the 14 OFDM symbols of the discovery subframe are divided into one group, and, in each group, the first symbol is a pilot OFDM symbol and the second symbol is a device information OFDM symbol; or every two of the 14 OFDM symbols of the discovery subframe are divided into one group, and, in each group, the first symbol is a device information OFDM symbol and the second symbol is a pilot OFDM symbol; or every seven of the 14 OFDM symbols of the discovery subframe are divided into one group, and, in each group, any one symbol among the second symbol to the sixth symbol is a pilot OFDM symbol and other six OFDM symbols are device information OFDM symbols.

The structure of the discovery subframe provided in the embodiment of the present invention may be applied in the corresponding method embodiment 6. For details, refer to the description about Embodiment 6 and no repeated description is given here.

Mutual reference may be made to a same or similar part between embodiments in this specification. Each embodiment focuses on differences from other embodiments, and the implementation process described in each embodiment may be applied in other embodiments. In particular, for an apparatus embodiment, the units included in the apparatus embodiment are merely divided according to function logic but are not limited to such division. Any division is appropriate as long as it can implement the corresponding functions. In addition, a specific name of each functional unit is merely intended for mutual differentiation instead of limiting the protection scope of the present invention. For an apparatus embodiment, the apparatus embodiment is described briefly because it is basically similar to the method embodiment, and, for related parts, refer to a part of description of the method embodiment.

In addition, a person of ordinary skill in the art may understand that, all or some of the steps of the methods of the embodiments may be implemented by a program instructing related hardware. The corresponding program may be stored in a computer-readable storage medium, where the storage medium may be a medium capable of storing program code, such as a USB flash drive, a removable hard disk, a read-only memory (Read-Only Memory, ROM), a random access memory (Random Access Memory, RAM), a magnetic disk, or an optical disc.

The foregoing descriptions are merely exemplary embodiments of the present invention, but are not intended to limit the present invention. Any modifications, equivalent substitutions, and improvements made within the spirit and principles of the present invention shall fall within the protection scope of the present invention.

What is claimed is:

1. A discovery method in a device to device (D2D) communications system, comprising:
  acquiring, by a first D2D user equipment (UE), timing information of the first D2D UE from a Long Term Evolution (LTE) cellular communications system;
  receiving, by the first D2D UE in a first discovery subframe, a device discovery signal from a second D2D UE according to the timing information, and the device discovery signal comprises a pilot orthogonal frequency division multiplexing (OFDM) symbol and a device information OFDM symbol; and
  acquiring, by the first D2D UE, an arrival time of the device discovery signal sent by the second D2D UE by performing a time domain correlation of the pilot OFDM symbol of the device discovery signal received in the first discovery subframe and a local pilot sequence, and acquiring device information of the second D2D UE by parsing the device information OFDM symbol of the device discovery signal received in the first discovery subframe;

wherein the first discovery subframe comprises 14 OFDM symbols, and a frame structure of the first discovery subframe comprises:

every seven OFDM symbols of the first discovery subframe are divided into one group, and, in each group, any one symbol among the second symbol to the sixth symbol is a pilot OFDM symbol and other six OFDM symbols are device information OFDM symbols.

2. The method according to claim 1, wherein the first discovery subframe comprises a plurality of OFDM symbols, and each of the OFDM symbols is divided into M frequency resource elements in a frequency domain, wherein M is an integer greater than or equal to 1; and one or more frequency resource elements of each OFDM symbol serve as a device discovery resource element, and one or more of the device discovery resource elements are selected by each D2D UE as a carrier for a device discovery signal of the each D2D UE.

3. The method according to claim 1, wherein, when the timing information is uplink timing information or downlink timing information, receiving, by the first D2D UE in the first discovery subframe, the device discovery signal from the second D2D UE according to the timing information comprises:

receiving, by the first D2D UE in the first discovery subframe, the device discovery signal from the second D2D UE according to the uplink timing information or the downlink timing information of the first D2D UE.

4. The method according to claim 1, wherein the first discovery subframe comprises a plurality of OFDM symbols, and each of the OFDM symbols comprises a cyclic prefix (CP), and a guard interval (GI) is added to the first discovery subframe, wherein the GI is located between the first discovery subframe and an adjacent paging subframe following the first discovery subframe, and the length of the CP of the first discovery subframe is determined according to the GI.

5. The method according to claim 1, wherein the first discovery subframe comprises a plurality of OFDM symbols, and each of the OFDM symbols comprises a cyclic prefix (CP), wherein:

both the first discovery subframe and an adjacent paging subframe following the first discovery subframe use normal CPs or extended CPs.

6. The method according to claim 1, wherein the method further comprises:

sending, by the first D2D UE, a device discovery signal to the second D2D UE in a second discovery subframe according to the timing information, so that the second D2D UE receives, in the second discovery subframe, the device discovery signal sent by the first D2D UE, performs a time domain correlation of a pilot OFDM symbol of the device discovery signal received hi the second discovery subframe and a local pilot sequence, to acquire an arrival time of the device discovery signal sent by the first D2D UE, parses a device information OFDM symbol of the device discovery signal received in the second discovery subframe, to acquire device information of the first D2D UE.

7. The method according to claim 1, wherein the method further comprises:

calculating, by the first D2D UE, a time at which a signal is sent to the second D2D UE, according to the acquired arrival time of the device discovery signal sent by the second D2D UE and the device information of the second device.

8. A device to device (D2D) user equipment (UE), comprising:

a processor, configured to acquire timing information of the D2D UE from a Long Term Evolution (LTE) cellular communications system;

a receiver, configured to receive, in a first discovery subframe, a device discovery signal from a second D2D UE according to the timing information, and the device discovery signal comprises a pilot orthogonal frequency division multiplexing (OFDM) symbol and a device information OFDM symbol; and the processor is further configured to: acquire an arrival time of the device discovery signal sent by the second D2D UE by performing a time domain correlation of the pilot OFDM symbol of the device discovery signal received in the first discovery subframe and a local pilot sequence, and acquire device information of the second D2D UE by parsing the device information OFDM symbol of the device discovery signal received in the first discovery subframe;

wherein the first discovery subframe comprises 14 OFDM symbols, and a frame structure of the first discovery subframe comprises:

every seven OFDM symbols of the first discovery subframe are divided into one group, and, in each group, any one symbol among the second symbol to the sixth symbol is a pilot OFDM symbol and other six OFDM symbols are device information OFDM symbols.

9. The D2D UE according to claim 8, wherein the first discovery subframe comprises a plurality of OFDM symbols, and each of the OFDM symbols is divided into M frequency resource elements in a frequency domain, wherein M is an integer greater than or equal to 1; and one or more frequency resource elements of each OFDM symbol serve as a device discovery resource element, and one or more of the device discovery resource elements are selected by each D2D UE as a carrier for a device discovery signal of the each D2D UE.

10. The D2D UE according to claim 8, wherein, when the timing information is uplink timing or downlink timing, the receiver is configured to receive, in the first discovery subframe, the device discovery signal from the second D2D UE according to the uplink timing or the downlink timing of the D2D UE.

11. The D2D UE according to claim 8, wherein the first discovery subframe comprises a plurality of OFDM symbols, and each of the OFDM symbols comprises a cyclic prefix (CP), and a guard interval (GI) is added to the first discovery subframe, wherein the GI is located between the first discovery subframe and an adjacent paging subframe following the first discovery subframe, and the length of the CP of the first discovery subframe is determined according to the GI.

12. The D2D UE according to claim 8, wherein the first discovery subframe comprises a plurality of OFDM symbols, and each of the OFDM symbols comprises a cyclic prefix (CP), wherein:

both the first discovery subframe and an adjacent paging subframe following the first discovery subframe use normal CPs or extended CPs.

13. The D2D UE according to claim 8, wherein the D2D UE further comprises a transmitter, configured to send a device discovery signal to the second D2D UE in a second discovery subframe according to the timing information, so that the second D2D UE receives, in the second discovery subframe, the device discovery signal sent by the D2D UE, performs a time domain correlation of a pilot OFDM symbol of the device discovery signal received in the second discovery subframe and a local pilot sequence, to acquire an arrival time of the device discovery signal sent by the D2D UE, parses a device information OFDM symbol of the device discovery signal received in the second discovery subframe, to acquire device information of the D2D UE.

14. The D2D UE according to claim 13, wherein, when the timing information is uplink timing or downlink timing, the transmitter is configured to send the device discovery signal to the second D2D UE in the second discovery subframe according to the uplink timing or the downlink timing of the D2D UE.

* * * * *